United States Patent
Alon et al.

(10) Patent No.: US 7,146,330 B1
(45) Date of Patent: Dec. 5, 2006

(54) METHOD AND SYSTEM FOR CREATING AND MANAGING GROUPS FOR INCREASING BUYING POWER ON THE WORLD WIDE WEB

(75) Inventors: Amir Alon, Sunnyvale, CA (US); Ilan Judkiewicz, Givat Shmuel (IL)

(73) Assignee: Vulcan Portals, Inc., Seattle, WA (US)

( * ) Notice: Subject to any disclaimer, the term of this patent is extended or adjusted under 35 U.S.C. 154(b) by 0 days.

(21) Appl. No.: 09/497,373

(22) Filed: Feb. 3, 2000

Related U.S. Application Data

(60) Provisional application No. 60/119,220, filed on Feb. 8, 1999.

(51) Int. Cl.
G06Q 30/00 (2006.01)
(52) U.S. Cl. ........................................... 705/26
(58) Field of Classification Search .................. 705/26, 705/27, 80
See application file for complete search history.

(56) References Cited

U.S. PATENT DOCUMENTS

| | | |
|---|---|---|
| 5,377,095 A | 12/1994 | Maeda et al. |
| 5,394,324 A | 2/1995 | Clearwater |
| 5,794,219 A * | 8/1998 | Brown ................ 705/37 |
| 5,835,896 A | 11/1998 | Fisher et al. |
| 5,873,069 A * | 2/1999 | Reuhl et al. ........... 705/26 |
| 5,890,137 A | 3/1999 | Koreeda |
| 5,905,975 A * | 5/1999 | Ausubel ............... 705/26 |
| 5,913,210 A | 6/1999 | Call |
| 5,999,914 A | 12/1999 | Blinn et al. |
| 6,014,644 A | 1/2000 | Erickson |
| 6,021,398 A | 2/2000 | Ausubel |
| 6,026,383 A | 2/2000 | Ausubel |
| 6,032,125 A | 2/2000 | Ando |
| 6,035,288 A | 3/2000 | Solomon |
| 6,041,308 A | 3/2000 | Walker et al. |
| 6,049,774 A | 4/2000 | Roy |

(Continued)

FOREIGN PATENT DOCUMENTS

WO   WO 00/30004   5/2000

(Continued)

OTHER PUBLICATIONS

U.S. Appl. No. 09/348,812, filed Mar. 6, 2000, Reddi.

(Continued)

*Primary Examiner*—Jeffrey A. Smith
(74) *Attorney, Agent, or Firm*—Fenwick & West LLP

(57) ABSTRACT

A method and system are provided for using a computer to facilitate a sales transaction between a group of buyers and at least one seller. Potential buyers may create a group organized for purchasing a product/service from one or more sellers. The computer system may output the buyers' collective request for the product/service to one or more sellers of the requested item. The sellers may respond by providing a price quotation for the requested item, often on the basis of the number of such items to be purchased by the group. The computer system notifies group members of the submitted seller quotations, in response to which some buyers may commit themselves to purchasing the item at the specified price or otherwise indicating a price at which they would be willing to commit to purchasing the item. Sellers may review the price quotations submitted by other sellers and submit competing price quotations. In a typical arrangement, an iterative process ensues in which sellers offer lower and lower prices for the requested products/services until reaching a point at which one or more buyers in the group are sufficiently comfortable with the price to commit themselves to purchasing the product/service.

62 Claims, 5 Drawing Sheets

U.S. PATENT DOCUMENTS

| | | | |
|---|---|---|---|
| 6,055,504 | A | 4/2000 | Chou et al. |
| 6,067,528 | A | 5/2000 | Breed et al. |
| 6,076,070 | A | 6/2000 | Stack |
| 6,078,897 | A * | 6/2000 | Rubin et al. ............... 705/14 |
| 6,081,789 | A | 6/2000 | Purcell |
| 6,085,169 | A | 7/2000 | Walker et al. |
| 6,101,484 | A * | 8/2000 | Halbert et al. ............ 705/26 |
| 6,112,189 | A | 8/2000 | Rickard et al. |
| 6,119,101 | A | 9/2000 | Peckover |
| 6,141,653 | A | 10/2000 | Conklin et al. |
| 6,141,666 | A | 10/2000 | Tobin |
| 6,260,024 | B1 * | 7/2001 | Shkedy ..................... 705/26 |
| 6,260,047 | B1 * | 7/2001 | Fox et al. .................. 705/26 |
| 6,269,343 | B1 * | 7/2001 | Pallakoff ................... 705/26 |
| 6,324,522 | B1 | 11/2001 | Peterson et al. |
| 6,332,129 | B1 | 12/2001 | Walker et al. |
| 6,418,415 | B1 * | 7/2002 | Walker et al. .............. 705/26 |
| 6,473,740 | B1 * | 10/2002 | Cockrill et al. ............ 705/27 |
| 6,516,302 | B1 | 2/2003 | Deaton et al. |
| 6,631,356 | B1 | 10/2003 | Van Horn et al. |
| 6,876,983 | B1 * | 4/2005 | Goddard .................... 705/37 |

FOREIGN PATENT DOCUMENTS

| | | | |
|---|---|---|---|
| WO | WO 00/30005 | | 5/2000 |
| WO | WO 00/34841 | | 6/2000 |
| WO | WO 00/34842 | | 6/2000 |
| WO | WO 00/34843 | | 6/2000 |
| WO | WO 00/34886 | | 6/2000 |
| WO | WO 00/43928 | | 7/2000 |
| WO | WO 00/43929 | | 7/2000 |
| WO | WO 00/43938 | | 7/2000 |
| WO | 00/46686 | * | 8/2000 |
| WO | WO 00/45318 | | 8/2000 |
| WO | WO 00/48104 | | 8/2000 |
| WO | WO 00/59224 | | 10/2000 |
| WO | WO 01/02992 A2 | | 1/2001 |

OTHER PUBLICATIONS

U.S. Appl. No. 09/250,039, filed Apr. 7, 2000, Grossman et al.
U.S. Appl. No. 09/249,727, filed Feb. 13, 1999, Ehrlich et al.
U.S. Appl. No. 09/233,274, filed Mar. 8, 2000, Leibzon.
U.S. Appl. No. 60/116,729, filed Jan. 22, 1999, Reddi.
U.S. Appl. No. 60/118,189, filed Feb. 1, 1999, Ehrlich et al.
U.S. Appl. No. 60/097,933, filed Aug. 21, 1998, Pallakoff et al.
U.S. Appl. No. 60/097,933, filed Sep. 28, 1998, Pallakoff et al.
An Exploratory Study of the Emerging Role of Electronic Intermediaries, by Joseph B. Bailey and Yannis Bakos, International Journal of Electronic Commerce, vol. 1, No. 3, Spring 1997, pp. 7-20. (Document submitted includes Abstract and pages numbered 1-14.)
Search Report dated Sep. 8, 1999 for U.S. Appl. No. 09/281,859.
Internet World (Mecklemedia), Cliff Figallo, "Hosting Web Communities," Building Relationships, Increasing Customer Loyalty, and Maintaining a Competitive Edge. Published by John Wiley & Sons, Inc, Copyright 1998.
Online document from Savvio.com, "Savvio.com: Our Story," wysiwyg://8/http://www.savvio.com/about/aboutUS.jsp, Printed Sep. 28, 2000.
"Retail Federation Group Buying Set," HDF—The Weekly Home Furnishings Newspaper, v0, n0, p. 9, Dec. 26, 1994.
"Frontier Rings Up a Sale with National Retail Federation," PR Newswire, p119NYM057, Jan. 19, 1998.
"NRF: home page of World Wide Web (National Foundation Launches Site)," The Weekly Newspaper for the Home Furnishings Network, v70, n42, p. 10(1), Oct. 14, 1996.
"KMART" Targets GE as EDI Provider Signals GE's Re-Commitment to EDI, EDI News, v11, n21, Oct. 13, 1997.
"National Federation Selects GE Information Services for EDI Service Partnership," PR Newswire, p1006DCM009, Oct. 6, 1997.
Mielczarski, W.; Michalik, G.; Widjaja, M.; "Bidding strategies in electricity markets," PIC Proceedings of the $21^{st}$ 1999 IEEE International Conference, p. 71-76, May 16-21, 1999, Cat. #99CH36351, 1999.
DIALOG (R) File, The Gale Group, "Mosher" vies ARA as survival kit for small specialty stores, Daily News Record, v24, n22, p. 4(1) Feb. 2, 1994.
Hagel III et al., "The new infomediaries," The McKinsey Quarterly, 1997 No. 4, pp. 54-71.
Online Document from Agorics, Inc., http://www.agorics.com/, Sections: "A Survey of Auctions," "English Auction," "A Dutch Auction," "The First Price Auction," "The Vickrey Auction," "The Double Auction," "Auction Offshoots," "Auction Strategies," "Auction Histories," "Government Securities-Auctioned Off," "Collusion in Auctions," "Auction Bibliography," Dated 1996, Reprinted Oct. 25, 1999.

* cited by examiner

METHOD AND SYSTEM FOR CREATING AND MANAGING GROUPS FOR INCREASING BUYING POWER ON THE WORLD WIDE WEB

The instant application is a conversion application of provisional application No. 60/119,220, filed on Feb. 8, 1999, entitled METHOD AND APPARATUS FOR CREATING AND MANAGING GROUPS FOR INCREASING BUYING POWER ON THE WORLD WIDE WEB, listing as inventors Amir ALON and Ilan JUDKIEWICZ.

BACKGROUND OF THE INVENTION

1. Field of Invention

This invention is concerned with a method and apparatus for creating and managing consumer buying groups on electronic networks such as the Internet.

2. Description of Prior Art and Benefits of the Invention

Lawrence Lockwood, U.S. Pat. No. 5,576,951, describes an in-store automated sales and service system. In this system, the software generates a personalized sale presentation based on historical user data. Many such systems already exist on electronic networks such as the World Wide Web. See www.dell.com or www.amazon.com for further examples. Many sales organizations today operate two separate sales channels for direct sales and support, respectively. For example, a sales organization may have a call center, such as a telephone call center that allows a customer to call in and speak with a sales person, that coexists with, but is not integrated into, a web site on which the customer can automatically and interactively choose a product and configure his purchase.

FIG. 1 describes a typical process in which a consumer searches for a product and looks for competitive deals between a variety of vendors. A consumer first chooses a product category, e.g., VCRs (Step 101). The consumer next uses an on-line product comparison service to identify a set of product features of interest to the consumer and the relative importance of each feature (Step 103). Either formally or informally, the consumer arrives at either a single product of interest (e.g., Sony VCR Model No. 1460) and/or a list of product parameters important to the consumer. The consumer then searches for current retail prices for the specific product of interest or for products satisfying the product parameter list (Step 105). The consumer's search will eventually lead to a choice of whether he/she should purchase a product or not (Step 107). If the consumer decides to purchase the product (Step 107), then the consumer will buy the product from the selected merchant vendor (Step 109). Otherwise, the consumer will choose not to make a purchase (Step 111).

Another popular shopping process comprises using an online auction system, such as uBid.com or eBay.com. In such systems, the seller provides a limited quantity of certain items to be sold to the highest bidder.

In addition, U.S. Pat. No. 5,794,207 to Walker et al. describes a method and apparatus for effectuating bilateral buyer-driven commerce. In Walker's invention, the prospective buyers of goods and services communicate purchase offers globally to potential sellers, allowing sellers to search conveniently for relevant buyer purchase offers, and for sellers potentially to bind a buyer to a contract based on the buyer's purchase offer.

It is well known that when a buyer makes a purchase in a large quantity he can typically receive a better price than a purchase in a small quantity. What is missing in the prior art is a method and apparatus to bring together many individual buyers to form a group so that they may together seek the best deal from the sellers.

It would therefore be desirable to provide a method and an apparatus for creating and maintaining groups of buyers.

It would further be desirable to provide a mechanism and tools for the interaction of a buying group and various sellers.

SUMMARY OF THE INVENTION

Embodiments of the invention provide a method for using a computer to facilitate a sales transaction for the purchase of a product/service by a group of buyers from one or more sellers. The computer receives requests to purchase the product/service from buyers in the group. A collective request can be formed for purchasing the product/service using the received buyer requests. The collective request is sent to the seller who may in return send a suggested price quotation for the product/service. An agent entity is notified about the received suggested price whereupon buyers may decide to authorize the purchase of the product/service at the seller's suggested price quotation. The agent entity may be a buyer or the group itself, for example.

Embodiments of the invention also provide a method for using a computer to facilitate a sales transaction for the purchase of a product/service from one or more sellers. A seller may provide an agreed price for the product/service and/or a price reduction for the product/service on the basis of a group size. The computer may then receive requests to purchase the product/service by buyers, the buyers collectively forming a group. Monitoring of the group's size determines when/if the group has attained the size associated with the seller's agreed price or price reduction. If the appropriate group size is reached, then payment information may be provided to the seller.

Embodiments of the invention further provide a computer-readable data transmission medium containing a data structure that facilitates a sales transaction with a seller. The data transmission(s) sent to the seller may comprise a first portion that specifies a product/service for purchase by a group of buyers; a second portion that specifies a collective request by the group to purchase the product/service; a third portion that requests price information for the product/service from the seller; a fourth portion that specifies a time interval for which the collective request will remain active, and a fifth portion that specifies at least a minimum sales quantity for the product/service for which price information is requested.

Embodiments of the invention still further provide a computer-readable data transmission medium containing a data structure that facilitates a sales transaction with a buyer. The data transmission(s) sent to the buyer may comprise: a first portion that specifies a product/service for which purchase has been requested by the buyer; a second portion that identifies a group into which the buyer's purchase request has been joined with other purchase requests for the same product/service; a third portion that identifies a price quotation for the product/service received from a seller; and a fourth portion that asks the buyer if the buyer will commit to purchasing the product/service at the identified price quotation from the seller.

Embodiments of the invention additionally provide a computer-readable medium having computer-executable instructions for using a computer to facilitate a sales transaction for the purchase of a product/service by a group of buyers from at least one seller. The computer receives requests to purchase the product/service by buyers in the group. The computer forms a collective request for purchasing the product/service based upon the received buyer requests. The computer sends the collective request to the seller who may respond with a suggested price quotation for the product/service. The computer notifies an agent entity of the received suggested price quotation and may receive authorization from buyers for the purchase of the product/service at the seller's suggested price quotation.

Embodiments of the invention also provide a computer-readable medium having computer-executable instructions for using a computer to facilitate a sales transaction for the purchase of a product/service from at least one seller. A seller may provide an agreed price for the product/service and/or a price reduction for the product/service on the basis of a particular group size. The computer may then receive requests to purchase the product/service by buyers, the buyers collectively forming a group. The computer may monitor the group's size to determine if the group has attained the size associated with the seller's agreed price or price reduction. If the computer detects that the appropriate group size has been reached, then payment information may be provided to the seller.

Embodiments of the invention also provide a system for facilitating a sales transaction for the purchase of a product/service by a group of buyers from at least one seller. A purchase request receiver receives a request to purchase the product/service by buyers in the group. A collective request former builds a collective request for the purchase of the product/service based upon the received purchase requests. A transmitter sends the collective request to at least one seller. A price quotation receiver receives suggested price quotations for the product/service from sellers. A price quotation notifier notifies an agent entity of the received suggested price quotations. The agent entity may be a buyer in the group or the group, for example.

Embodiments of the invention additionally provide a system for facilitating a sales transaction for the purchase of a product/service from at least one seller. A memory retains an agreed price for the product/service from at least one seller or a price reduction for the product/service for a particular group size from the seller. A purchase request receiver receives requests to purchase the product/service by buyers, the buyers collectively forming a group. A group monitor monitors the group to determine when/if the group attains the group size associated with the seller. A payment provider provides payment information to the seller if the group monitor indicates that the group has attained the appropriate group size.

DETAILED DESCRIPTION OF AN ILLUSTRATED EMBODIMENT OF THE INVENTION

Embodiments of the invention provide a method and an apparatus for effectuating the creation, lifetime management, and eventual dissolution of groups that pursue, or intend to pursue, the purchase of products and services. Embodiments of the invention allow prospective buyers of goods and services to communicate their desire to create such groups, to set-up the groups, and to specify the groups' objectives, agenda, and timing parameters. Embodiments of the invention further facilitate the escalation and final commitment of group members to a purchase order for one or more products/services by their group.

Embodiments of the invention support the interactive negotiation with a vendor or multiple vendors by the apparatus or group members, during which process both the group commitment escalates and the vendor's bid for the group's purchase improves.

Embodiments of the invention also support the notification of both a group of sellers and a group of buyers regarding the group's bid/commit status.

Embodiments of the invention further support the secured, regulated transmission of an aggregate transaction information package, including information about multiple credit cards, multiple methods of payment and multiple billing and shipping addresses from a single source to a vendor.

Embodiments of the invention may also support the assignment of roles to participants of the group.

These and other objects of the invention may be achieved by providing, for example, a software package and Web services that collectively accomplish for an exemplary group purchase:

Creating groups of buyers,
Adding new members to an existing group,
Notifying buyers of pre-negotiated deals for group purchase,
Notifying various vendors about the group and collecting vendor bids,
Notifying buyers of existing vendor bids,
Receiving buyer commitments to buy,
Closing the deal with the vendor(s),
Collecting member payment data, and
Delivering payment data to the selected vendor(s).

FIGS. 2–5 of the drawings illustrate preferred embodiments of a method and system for implementing the invention. Of course, an ordinarily skilled artisan will recognize alternative methods of accomplishing the invention described herein.

Figure 1:
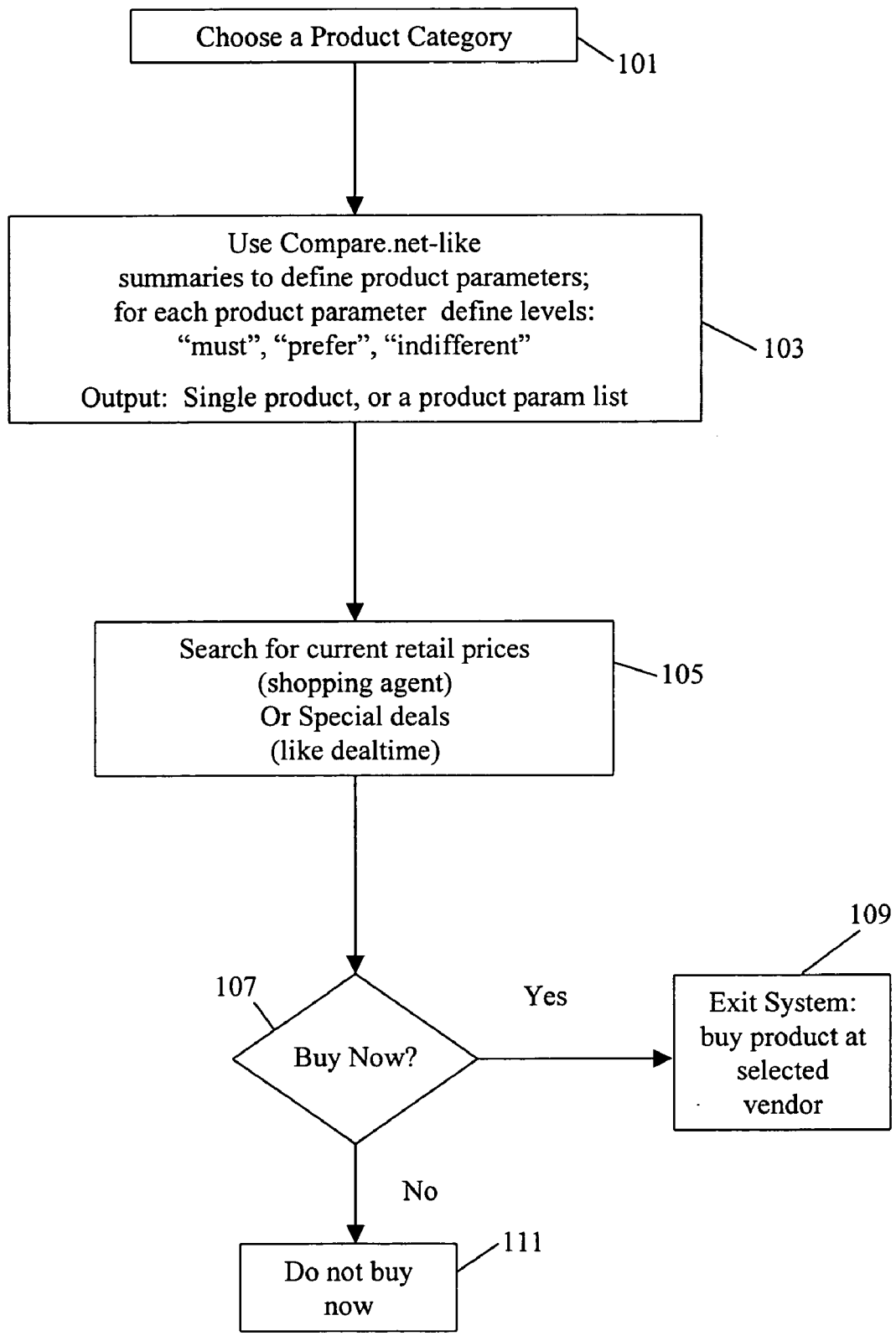
FIG. 1 illustrates a prior art searching procedure used by a consumer to search for and purchase a product of interest.
Figure 2:
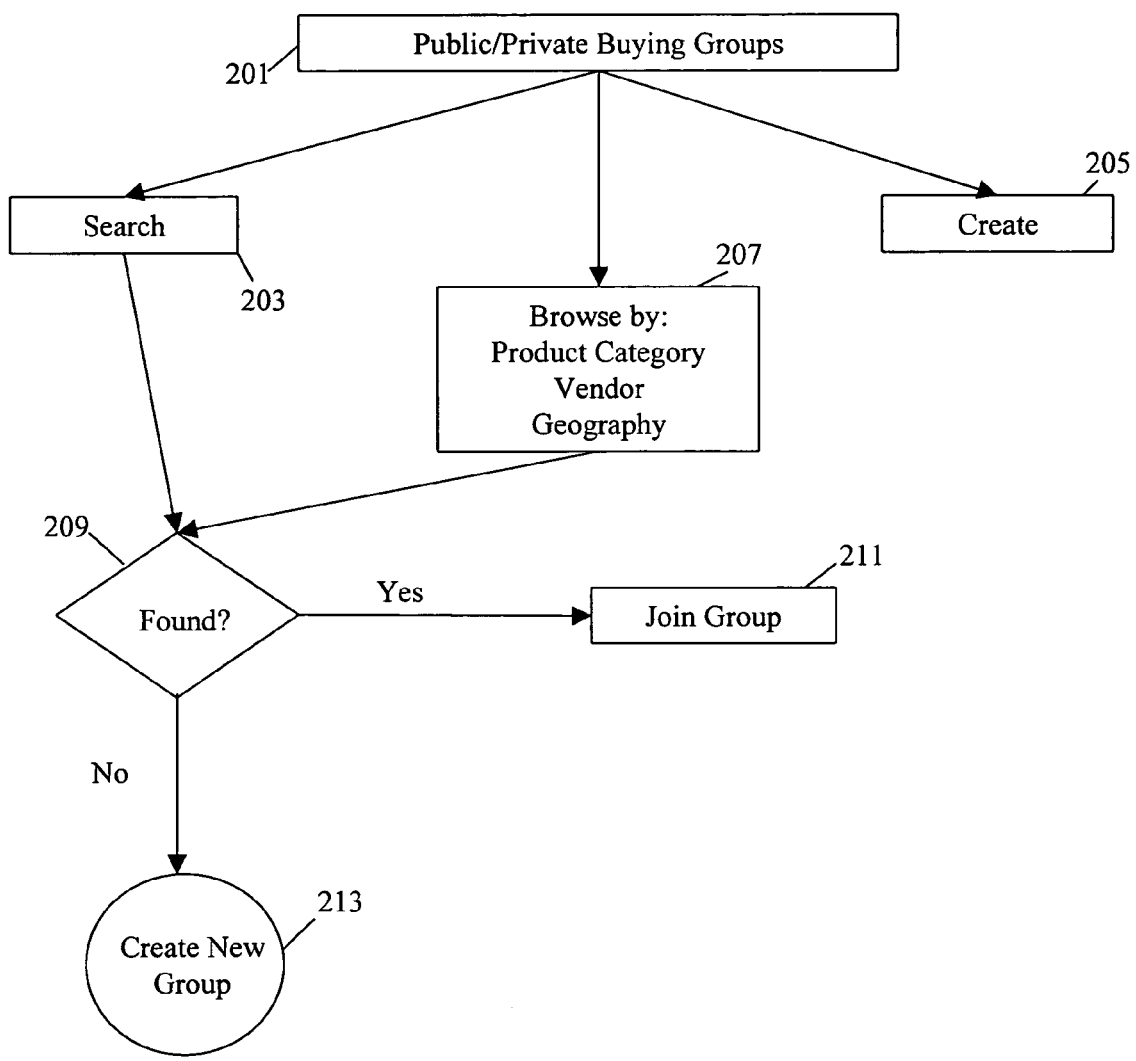
FIG. 2 illustrates high-level steps occurring in the formation of a group, according to an embodiment of the invention.

FIG. 2 illustrates the process by which a group may be formed and how a buyer may join the group, according to an embodiment of the invention. The buyer can select private or public groups (Step 201). Private groups may be controlled via password and ID, for example. A company Intranet, for example, can provide private groups for its employees. Once the buyer has located and entered the web page for group information, he can browse or search (step 207) existing groups to see if any existing groups have been formed for purchasing the same product in which he is interested. The browser-supported search (step 207) may, for example, be undertaken by "product category," "geography," and/or "vendor," as well as other group parameters, such as its size and formation date.

The buyer can also search a database of pre-negotiated group deals (step 203). Typically, such deals will provide the price or discount amount that various vendors are willing to accept for specific products or product lines for certain group sizes. Sony, for example, may be willing to provide 10% discount on all products for groups exceeding 100 buyers.

If a group is found (step 209), the buyer can join the group by providing his information (step 211). If a group does not exist (step 209), the buyer can create the group by specifying the product that he is seeking (step 213). Of course, the buyer may simply create the group without first conducting a search (step 205).

Figure 3:
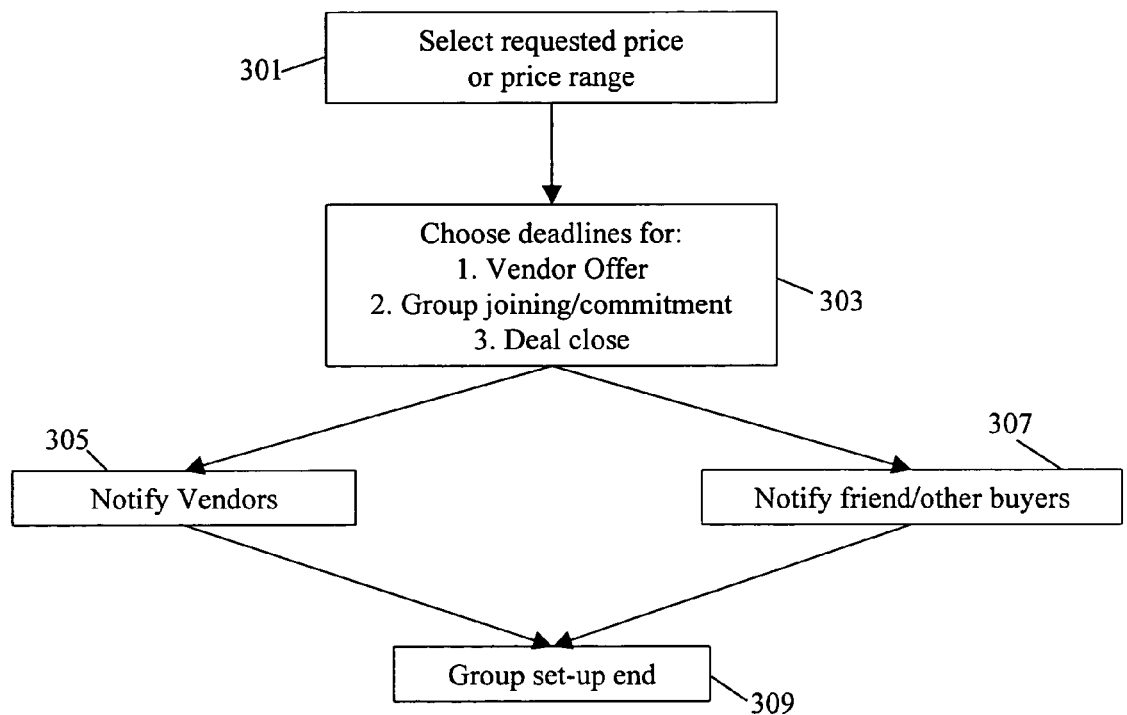
FIG. 3 illustrates an exemplary communications process occurring when a group is formed, according to an embodiment of the invention.

FIG. 3 illustrates exemplary procedures associated with creating a group and related communications, according to an embodiment of the invention.

Forming the group may include the steps of specifying price targets or ranges (step 301) and specifying deadlines for joining the group and/or receiving purchase commitments from members; deadlines for receiving vendor offers, and/or deadlines for closing the deal (step 303). Once a new group is formed, relevant vendors may be notified (step 305), as well as friends or other potential buyers (step 307) as part of concluding the group set-up procedure (step 309).

The notification processes associated with embodiments of the invention, such as steps 305 and 307 above, can be carried out in a variety of ways, including but not limited to e-mail messages, Internet immediate messaging, voice messaging, beeper messaging, and facsimile transmission. Also, the vendors and group members can log into the web site at any time and review the current status.

Figure 4:
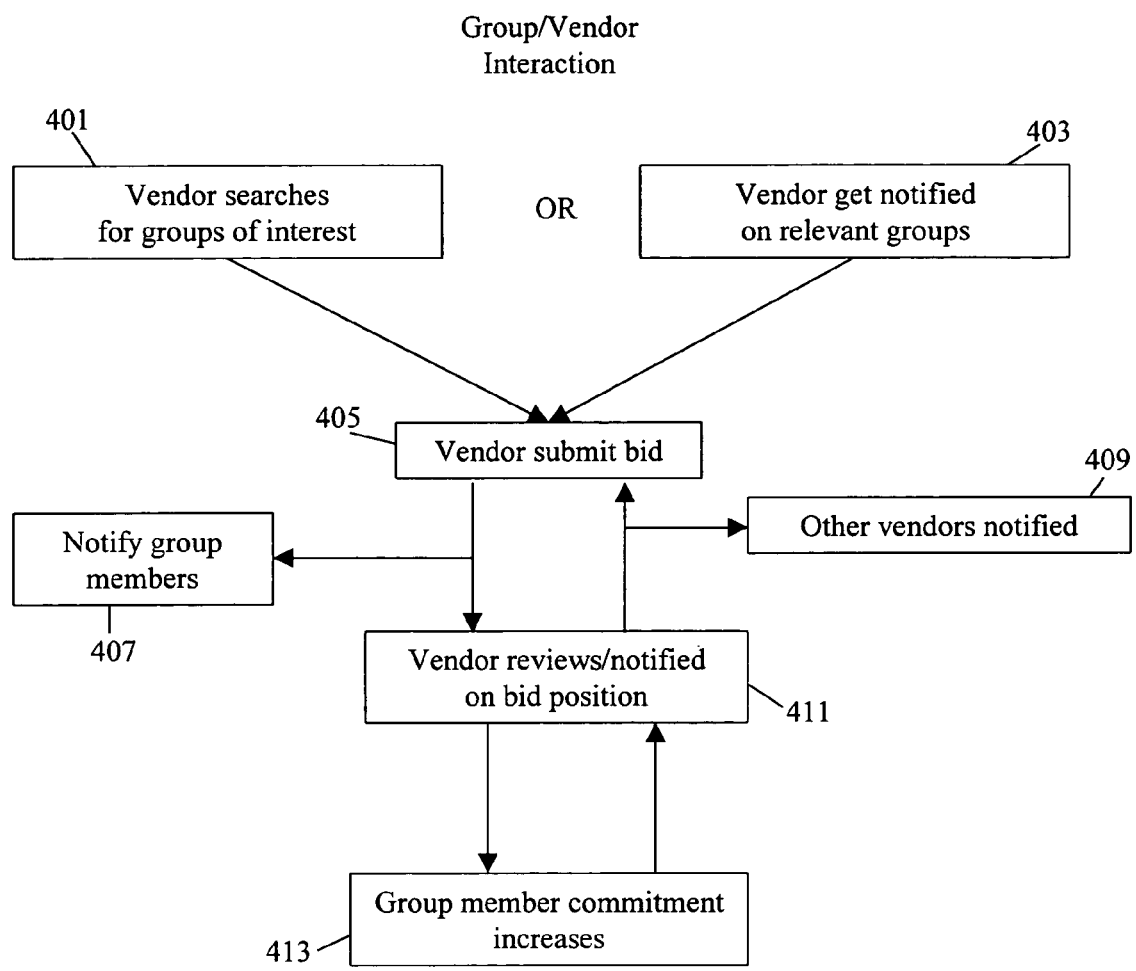
FIG. 4 provides an overview of the process by which customer commitment may be acquired, according to an embodiment of the invention.
Figure 5:
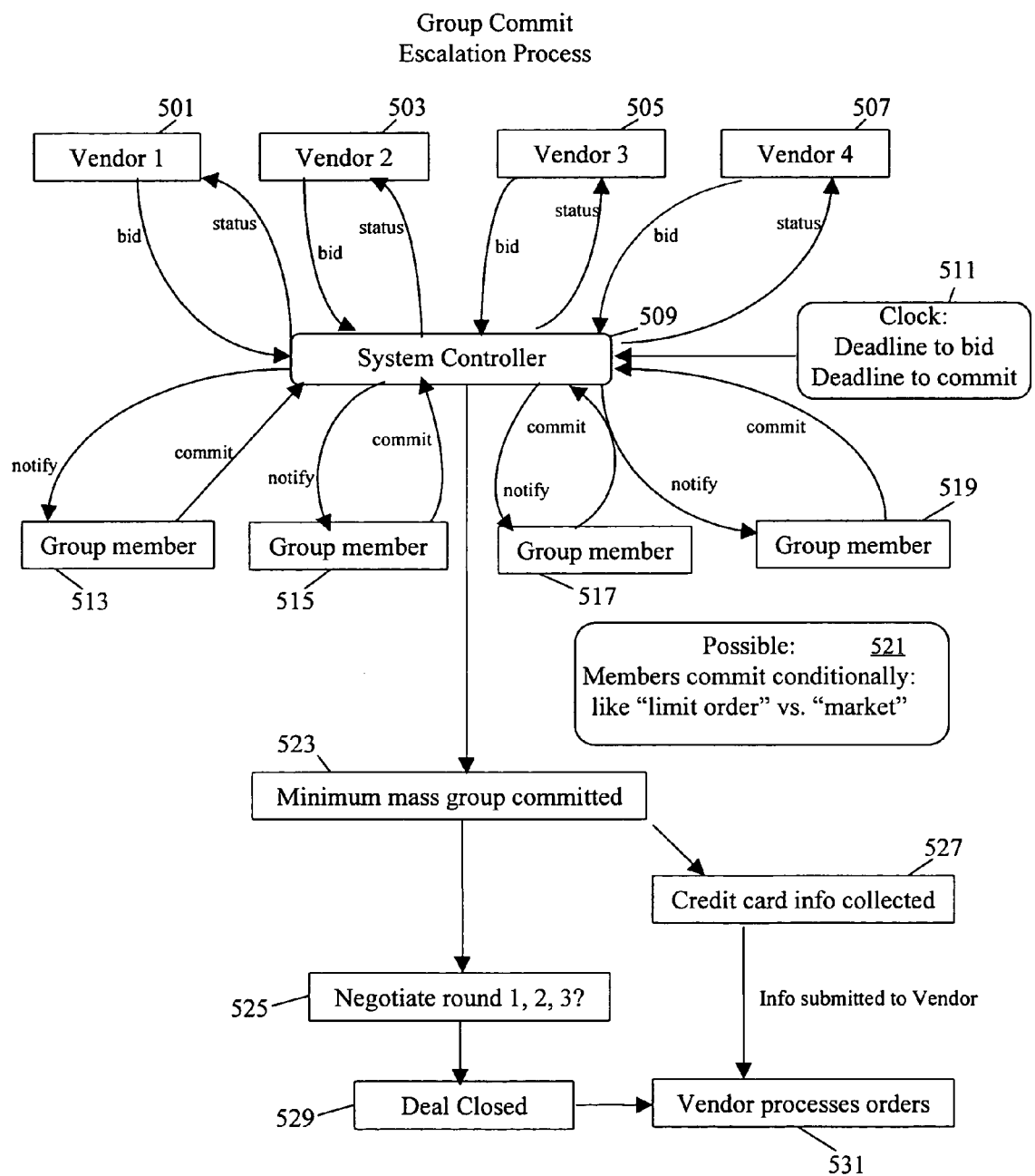
FIG. 5 provides a detailed example of the processes handled by the system controller, according to an embodiment of the invention.

FIGS. 4 and 5 illustrate the communication and decision processes by which the price negotiation between the group and the vendor(s)/seller(s) is conducted, according to an embodiment of the invention. In FIG. 4, the vendor(s) can either search for active groups of interest (step 401) or receive automatic notification each time a relevant group is formed (step 403). The vendor(s) can submit a bid at any time (step 405). Bids which are submitted before the formation of the group can specify pre-negotiated prices and discounts if the group attains a certain size. Group members are notified of the best bids (step 407) and may use such information in making individual commitment decisions (step 413).

Vendors may review bids submitted by other vendors and/or review the status of their own bid position (step 411). Of course, other vendors may also receive notification regarding bids submitted by other vendors (step 409). An iterative process may ensue in which subsequent bids from various vendors result in lower bid prices, as indicated by the arrows shown between steps 405 and 411. Moreover, as vendors' bid positions become more favorable to the group, more and more individual group members may commit to the group purchase, as indicated by the arrows between steps 411 and 413.

FIG. 5 illustrates in further detail interactions between vendors and group members and how such interactions may be controlled, according to an embodiment of the invention. Communication messages between vendors 501–507 and group members 513–519 may be relayed through a central system controller 509 that runs the software and provides the communication medium between the vendors 501–507 and the group members 513–519. This process can be monitored automatically or manually. A system clock 511, for example, can be used to check for deadlines. As a skilled artisan will recognize, the central system controller 509 may comprise a computer, such as a personal computer, and/or a dedicated hardware device.

The communication between the vendors 501–507 and the members 513–519 may include the current status of the groups, such as the total number of members, the number of committed members, the current bid, etc. Communications from the vendors 501–507 may include new bids. Communications from the members 513–519 may include commitments to buy at the current bid or at a certain price point, as well as messages withdrawing from the group message.

A group may be designed to have a minimum mass group commitment requirement, such as a requirement that a single member express a desire to purchase a product/service (step 523). Member commitment may be gauged in a variety ways (step 521). For example, a group member may submit a "limit order" indicating commitment at a particular price and/or a group member may submit a "market" order indicating commitment to a purchase at the market price. As members commit to the group purchase, their purchase information, such as credit card numbers, may be collected (step 527). The system controller 509 may include functionality for collecting and retaining the payment information. In addition, as discussed above, the payment information may be collected in a secure manner to prevent unauthorized use of such information.

As previously discussed, an iterative negotiation process typically facilitates the determination of the price for the product/service desired by the group and its members. The negotiation process may comprise one or more negotiation rounds between the vendors 501–507 and the group members 513–519 (step 525). The system controller 509 may include functionality configured to support the negotiation process, as indicated by the arrows between the vendors 501–507 and the system controller 509 and the group members 513–519 and the system controller 509.

Once at least one group member 513–519 and one vendor 501–507 have met at an agreed upon a bid, the deal may be closed (step 529). Again, the system controller 509 may include functionality configured to support the closing process. The deal closing typically comprises collecting and transferring payment information to the vendor who then processes the purchase orders (step 531). The payment information, preferably by credit card number, can be collected from the buyer at various times as discussed above, including sign-in time and just prior to closing. A check to make sure that the funds are available can be made before submitting the payment or payment information. Alternatively, the payment or payment information can be collected from the individual members and one payment can be forwarded to the vendor.

Once the deal is closed, the group may dissolve, or alternatively, some of the members may continue to try for an even better price.

It is apparent that a wide range of different working modes can be formed based on the invention without deviating from the its spirit and scope. Accordingly, this invention is not restricted by the specific embodiments disclosed herein. One skilled in the art may easily recognize numerous alternate approaches. For example, a skilled artisan will also recognize that the invention has been discussed in terms of both computer programs and systems utilizing hardware that perform similar functions, such as integrated circuits.

An ordinary artisan should require no additional explanation in developing the methods and systems described herein but may nevertheless find some possibly helpful guidance in the preparation of these methods and systems by examining standard reference works in the relevant art.

In general, in the following claims, the terms used should not be construed to limit the invention to the specific embodiments disclosed in the specification and the claims, but should be construed to include all such systems that operate under the claims set forth hereinbelow. Accordingly, the invention is not limited by the disclosure, but instead its scope is to be determined entirely by the following claims.

What is claimed is:

1. A method for using a computer to facilitate a sales transaction for purchasing a product/service by a group of buyers from a seller of a plurality of sellers, comprising:
   receiving into the computer requests to purchase the product/service by buyers of the group;
   forming a collective request for purchase of the product/service based upon the received buyer requests to purchase the product/service;
   sending the collective request to a plurality of sellers;
   receiving by an agent entity a suggested price quotation for the product/service from the a plurality of the sellers;
   automatically providing by the agent entity each received suggested price quotation to at least a plurality of the sellers for review, wherein the agent entity is an agent of the group of buyers;
   receiving by the agent entity another suggested price quotation for the product/service from at least one of the plurality of sellers;
   receiving purchase authorization to complete a sale from at least one buyer in the group to buy the product/service from any seller that has provided a suggested price quotation for the product/service.

2. The method of claim 1 wherein the agent entity is one of a buyer in the group or the group.

3. The method of claim 1, further comprising:
   collecting payment information from the at least one buyer in the group from whom the purchase authorization was received; and
   sending the payment information to the seller associated with the sale.

4. The method of claim 3 wherein the payment information is in the form of a credit card number for the at least one buyer in the group who is interested in buying the product/service.

5. The method of claim 1, further comprising:
   providing a setup tool that facilitates receiving group buy setup characteristics data that includes at least one of price targets for the product/service, buyer deadlines for joining the group, and buyer deadlines for receiving purchase authorization.

6. The method of claim 1 wherein the computer is connected to an electronic network and wherein the received requests to purchase the product/service are received over the electronic network.

7. The method of claim 6 wherein the electronic network is at least one of the World Wide Web, the Internet, or an intranet.

8. The method of claim 6 wherein the received requests to purchase the product/service are received in a secured format.

9. The method of claim 1 wherein the computer is connected to an electronic network and wherein the received suggested price quotation for the product/service is received over the electronic network.

10. The method of claim 1, further comprising:
    providing the agent entity with pre-negotiated prices for the product/service from any seller that has provided a suggested price quotation for the product/service.

11. The method of claim 1 wherein notifying the agent entity of the received suggested price quotation comprises sending a message to the agent entity in a format of at least one of an e-mail message, an Internet immediate message, a voice message, a beeper message, or a facsimile message.

12. A method for using a computer to facilitate a sales transaction for purchasing a product/service by a group of buyers from at least one seller, comprising:
    verifying that a plurality of buyers in the group satisfy a predetermined requirements list that requires a plurality of buyers in the group to have a common employer, wherein the common employer is independent of the seller;
    receiving into the computer buyer requests to purchase the product/service by verified buyers of the group;
    forming a collective request for purchase of the product/service based upon the received buyer requests to purchase the product/service;
    sending the collective request to the at least one seller;
    receiving a suggested price quotation for the product/service from the at least one seller;
    notifying an agent entity of the received suggested price quotation; and
    receiving purchase authorization from at least one verified buyer in the group to buy the product/service at the received suggested price quotation.

13. The method of claim 12 wherein sending the collective request to the at least one seller further comprises a price reduction request for the product/service based on a number of buyers in the group.

14. The method of claim 13 wherein the price reduction request further includes a preexisting group discount rate of the at least one seller.

15. The method of claim 12 wherein the received suggested price quotation is based on a number of buyers in the group.

16. The method of claim 12, further comprising:
    receiving into the computer a group buy setup characteristics data set that includes at least one of price targets for the product/service, buyer deadlines for joining the group, buyer deadlines for submitting purchase authorization, and deadlines for dosing the sales transaction.

17. The method of claim 12 wherein verifying that buyers in the group satisfy a requirements list comprises:
    determining that user names and passwords received from buyers match user names and passwords associated with the common employer in the requirements list.

18. A method for using a computer to facilitate a sales transaction for purchasing a product/service from a seller, comprising:
    receiving from a seller at least one of an agreed price for the product/service or a price reduction for the product/service for at least one group size;
    receiving into the computer requests to purchase the product/service by buyers, the buyers collectively forming a group, the computer configured to receive the requests to purchase the product/service after receiving from the at least one seller the agreed price or the price reduction;
    monitoring the group to determine if the group has attained the at least one group size;
    providing buyer payment information to the seller if the group attains the at least one group size;
    automatically providing by the agent entity to a plurality of other sellers for review the at least one of an agreed price for the product/service or the price reduction for the product/service for at least one group size received from the at least one seller, wherein the agent entity is independent of the seller and the plurality of other sellers;

receiving another agreed price or price reduction for the product/service from one of the plurality of other sellers; and notifying buyers in the group of the received another agreed price.

19. The method of claim 18, further comprising:
requesting the at least one seller to honor the at least one of an agreed price for the product/service or the price reduction for the product/service for the at least one group size.

20. The method of claim 18, further comprising:
collecting payment information from buyers in the group who have submitted requests to purchase the product/service.

21. The method of claim 20 wherein the payment information is in the form of a credit card number for each buyer of the buyers in the group who are interested in buying the product/service.

22. A method for using a computer to facilitate a sales transaction for purchasing a product/service from a seller, comprising:

receiving from at least one seller at least one of an agreed price for the product/service or a price reduction for the product/service for at least one group size;

receiving into the computer requests to purchase the product/service by prospective buyers;

verifying that each prospective buyer satisfies a requirements list before including the prospective buyer in a buying group, the requirements list including a requirement that a plurality of buyers in the group have a common employer, wherein the common employer is independent of the seller;

monitoring the buying group to determine if the buying group has attained the at least one group size; and providing payment information to the at least one seller if the group attains the at least one group size.

23. The method of claim 22, further comprising:
receiving into the computer group buy setup characteristics data that includes at least one of buyer deadlines for joining the group, buyer deadlines for submitting purchase authorization, and deadlines for closing the sales transaction.

24. The method of claim 22, further comprising:
providing a setup tool that facilitates receiving group buy setup characteristics data that includes at least one of buyer deadlines for joining the group and buyer deadlines for receiving purchase authorization.

25. The method of claim 22 wherein the computer is connected to an electronic network and wherein the received requests to purchase the product/service are received over the electronic network.

26. The method of claim 22 wherein the electronic network is at least one of the World Wide Web, the Internet, or an intranet.

27. The method of claim 26 wherein the received requests to purchase the product/service are received in a secured format.

28. The method of claim 22 wherein the computer is connected to an electronic network and wherein the payment information is provided to the at least one seller over the electronic network.

29. The method of claim 22, further comprising:
notifying at least one buyer in the group that the group has attained the at least one group size.

30. The method of claim 29 wherein the buyer in the group is notified via at least one of an e-nail message, an Internet immediate message, a voice message, a beeper message, and a facsimile message.

31. A system for facilitating a sales transaction for the purchase of a product/service by a group of buyers from at least one seller, comprising:

a purchase request receiver configured to receive a request to purchase the product/service by at least one buyer of the group, and to restrict buyers in the group to buyers matching a predetermined requirements list that requires a plurality of buyers in the group to have a common employer, wherein the common employer is independent of the seller;

a collective request former configured to form a collective request for the purchase of the product/service based upon the received requests to purchase the product/service;

a transmitter configured to send the collective request to the at least one seller;

a price quotation receiver configured to receive a suggested price quotation for the product/service from the at least one seller; and a price quotation notifier configured to notify an agent entity of the received suggested price quotation.

32. The system of claim 31 wherein the agent entity is at least one buyer in the group and wherein the price quotation notifier is further configured to receive purchase authorization from the at least one buyer in the group who is interested in buying the product/service at the received suggested price quotation.

33. The system of claim 31, further comprising:
a payment collector configured to collect payment information from the buyers in the group who are interested in buying the product/service at the received suggested price quotation and send the collected payment information to the at least one seller.

34. The system of claim 33 wherein the payment collector processes payment information in the form of a credit card number for the buyers in the group who are interested in buying the product/service.

35. The system of claim 31 wherein the price quotation notifier is further configured to notify the agent entity of a received another suggested price quotation if the price quotation receiver receives another suggested price quotation for the product/service from at least another seller.

36. The system of claim 31, further comprising:
a price quotation repository that allows at least another seller to review the received price quotation for the product/service from the at least one seller.

37. The system of claim 31 wherein the collective request former is further configured to form the collective request for the purchase of the product/service to include a price reduction request for the product/service based on a number of buyers in the group.

38. The system of claim 37 wherein the price reduction request further includes a preexisting group discount rate of the at least one seller.

39. The system of claim 31 wherein the collective request former includes a number of buyers in the group in the collective request.

40. The system of claim 31, further comprising:
a setup tool configured to establish group buy setup characteristics data that includes at least one of price targets for the product/service, buyer deadlines for joining the group, buyer deadlines for receiving purchase authorization, and deadlines for closing the sales transaction.

41. The system of claim 31 wherein the purchase request receiver is connected to an electronic network and wherein the purchase request receiver receives requests to purchase the product/service over the electronic network.

42. The system of claim 41 wherein the electronic network is at least one of the World Wide Web, the Internet, or an intranet.

43. The system of claim 41 wherein the purchase request receiver is further configured to receive requests to purchase the product/service in a secured format.

44. The system of claim 31 wherein the price quotation receiver is connected to an electronic network and wherein the price quotation receiver receives suggested price quotations for the product/service over the electronic network.

45. The system of claim 31, further comprising:
a purchase database configured to provide the buyers of the group with pre-negotiated prices for the product/service from the at least one seller.

46. The system of claim 31 wherein the price quotation notifier is further configured to notify at least one buyer in the group of the received suggested price quotation by preparing a message to the buyer in a format of at least one of an e-mail message, Internet immediate message, voice message, beeper message, and facsimile message.

47. A system for facilitating a sales transaction for the purchase of a product/service from a seller comprising:
a memory configured to retain an agreed price for the product/service from a first seller or a price reduction for the product/service for a specific quantity of the product/service from the first seller;
a communications interface configured to be used by an agent entity to automatically provide to a plurality of other sellers for review an agreed price for the product/service from the first seller or a price reduction for the product/service for a specific quantity of the product/service from the first seller, wherein the agent entity is independent of the sellers, wherein the memory is further configured to retain another suggested price quotation for the product/service from another seller of the plurality of other sellers;
a price notifier configured to notify each of the buyers in the group of the another suggested price quotation;
a purchase request receiver configured to receive requests to purchase the product/service by buyers, the purchase request receiver configured to receive the requests to purchase the product/service after receiving the agreed price or the price reduction;
a group monitor configured to monitor the group to determine if the group has attained a pre-determined group size; and
a payment provider configured to provide payment information to the first seller if the group monitor indicates that the group has attained the pre-determined group size.

48. The system of claim 47, further comprising:
a sale manager configured to request the first seller to honor the at least one of an agreed price for the product/service or the price reduction for the product/service for the at least one group size.

49. The system of claim 47, further comprising:
a payment collector configured to collect payment information from buyers in the group who have submitted requests to purchase the product/service.

50. The method of claim 49 wherein the payment information is in the form of a credit card number for each buyer in the group who is interested in buying the product/service.

51. The system of claim 47 in which the purchase request receiver is configured to restrict buyers in the group to buyers matching a requirements list.

52. The system of claim 51 wherein the requirements list includes as a requirement that more than one buyer in the group have a common employer.

53. The system of claim 47, her comprising:
a setup tool configured to provide a group buy setup characteristics data that includes at least one selected from the group consisting of:
buyer deadlines for joining the group, buyer deadlines for receiving purchase authorization, and deadlines for closing the sales transaction.

54. The system of claim 47 wherein the purchase request receiver is connected to an electronic network and wherein the purchase request receiver is further configured to receive requests to purchase the product/service over the electronic network.

55. The system of claim 54 wherein the electronic network is at least one of the World Wide Web, the Internet, or an intranet.

56. The system of claim 54 wherein the purchase request receiver is further configured to receive requests to purchase the product/service in a secured format.

57. The system of claim 47 wherein the payment provider is connected to an electronic network and wherein the payment provider is further configured to provide the payment information to the at least one seller over the electronic network.

58. The system of claim 47, further comprising:
a group-buying notifier configured to notify at least one buyer in the group that the group has attained the at least one group size.

59. The system of claim 58 wherein the at least one buyer is notified via at least one of an e-mail message, Internet immediate message, voice message, beeper message, and facsimile message.

60. A method for using a computer to facilitate a sales transaction for purchasing a product/service by a group of buyers from a seller, comprising:
verifying that a plurality of buyers in the group share a common characteristic associated with a third party that is not any of the buyers or the seller;
receiving into the computer requests to purchase the product/service from verified buyers of the group;
forming a collective request for purchase of the product/service based upon the received buyer requests to purchase the product/service;
sending the collective request to the seller;
receiving a suggested price quotation for the product/service from the seller;
automatically notifying an agent entity of the suggested price quotation received from the seller; and
receiving purchase authorization from at least one verified buyer in the group to buy the product/service at the suggested price quotation received from the seller.

61. A method for using a computer to facilitate a sales transaction for purchasing a product/service from a seller, comprising:
receiving from the seller a sales price for the product/service or a price reduction for the product/service for a specified group size;
receiving into the computer requests to purchase the product/service by prospective buyers;

verifying that each prospective buyer satisfies a requirements list before including the prospective buyer in a buying group, the requirements list including a requirement that a plurality of buyers in the group share a common characteristic associated with a third party that is not any of the buyers or the seller;

monitoring the buying group to determine if the buying group has attained the specified group size; and providing payment information to the seller if the group attains the specified group size.

62. A system for facilitating a sales transaction for the purchase of a product/service by a group of buyers from at least one seller, comprising:

a purchase request receiver configured to receive requests to purchase the product/service by a buyer in the group, and to verify that a plurality of buyers in the group share a common characteristic associated with a third party that is not any of the buyers or the seller;

a request former configured to form a collective request for the purchase of the product/service based upon the received requests to purchase the product/service;

a transmitter configured to send the collective request to the seller;

a price receiver configured to receive a suggested price quotation for the product/service from the seller; and a price notifier configured to automatically notify an agent entity of the received suggested price quotation.

* * * * *

UNITED STATES PATENT AND TRADEMARK OFFICE
CERTIFICATE OF CORRECTION

PATENT NO. : 7,146,330 B1
APPLICATION NO. : 09/497373
DATED : December 5, 2006
INVENTOR(S) : Amir Alon and Ilan Judkiewicz It is certified that error appears in the above-identified patent and that said Letters Patent is hereby corrected as shown below:

Page 2, Column 2, line 2, "U.S. Appl. No. 60/097,933, filed Aug. 21, 1998, Pallakoff et al." should be changed to --U.S. Appl. No. 60/097,932, filed Aug. 25, 1998, Pallakoff et al.--.

Page 2, Column 2, line 3, "U.S. Appl. No. 60/097,933, filed Sep. 28, 1998, Pallakoff et al." should be changed to --U.S. Appl. No. 60/097,933, filed Aug. 25, 1998, Pallakoff et al.--.

Signed and Sealed this
Twenty-seventh Day of September, 2011

David J. Kappos
*Director of the United States Patent and Trademark Office*